United States Patent
Shen et al.

(10) Patent No.: US 10,911,138 B2
(45) Date of Patent: Feb. 2, 2021

(54) REPLACEMENT SCHEDULING METHOD AND SYSTEM FOR ULTRA-LOW LOSS OPTICAL FIBERS IN BACKBONE NETWORK

(71) Applicant: SOOCHOW UNIVERSITY, Suzhou (CN)

(72) Inventors: Gangxiang Shen, Suzhou (CN); Yongcheng Li, Suzhou (CN); Anliang Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 16/231,263

(22) Filed: Dec. 21, 2018

(65) Prior Publication Data
US 2019/0207677 A1     Jul. 4, 2019

Related U.S. Application Data

(63) Continuation-in-part of application No. PCT/CN2018/072984, filed on Jan. 17, 2018.

(51) Int. Cl.
*H04B 10/077* (2013.01)
*H04L 12/721* (2013.01)
*H04B 10/27* (2013.01)

(52) U.S. Cl.
CPC ......... *H04B 10/0773* (2013.01); *H04B 10/27* (2013.01); *H04L 45/123* (2013.01)

(58) Field of Classification Search
None
See application file for complete search history.

(56) References Cited

U.S. PATENT DOCUMENTS

| | | | | |
|---|---|---|---|---|
| 10,153,834 | B2* | 12/2018 | Shen | H04B 10/27 |
| 2016/0191346 | A1* | 6/2016 | Xia | H04L 41/0627 |
| | | | | 398/66 |
| 2018/0138972 | A1* | 5/2018 | Shen | H04B 10/27 |

FOREIGN PATENT DOCUMENTS

| | | |
|---|---|---|
| CN | 101420321 A | 4/2009 |
| CN | 106487685 A | 3/2017 |

OTHER PUBLICATIONS

Guan et al., "Migrating Elastic Optical Networks from Standard Single-Mode Fibers to Ultra-Low Loss Fibers: Strategies and Benefits", Jun. 1, 2017, Optical Society of America, 2017 Optical Fiber Communications Conference and Exhibition (OFC), 3 pages (Year: 2017).*

(Continued)

*Primary Examiner* — David W Lambert
(74) *Attorney, Agent, or Firm* — SZDC Law P.C.

(57) ABSTRACT

The invention relaxes to a replacement scheduling method and system for ultra-low loss optical fibers in a backbone network, which are designed to improve spectrum, utilization efficiency. The method includes: S1: calculating a gam respectively after each optical fiber link is replaced, that is, calculating a product of multiplying a quantity of frequency slots (FSs) reduced after each optical fiber link is replaced by a remaining time for finishing replacing all the remaining optical fiber links; S2: selecting an optical fiber link having the highest gain after the optical fiber link is replaced to perform replacement; and repeating S1 and S2 until all the optical fiber links that need to be replaced have been replaced. In the present invention, a replacement order of optical fibers is arranged most appropriately, so as to save as many as spectrum resources for operators for use by additional services. (FIG. 2)

2 Claims, 4 Drawing Sheets

(56) References Cited

OTHER PUBLICATIONS

Guan, Yanxin et al., Migrating Elastic Optical Networks from Standard Single-Mode Fibers to Ultra-Low Loss Fibers: Strategies and Benefits; Strategies and Benefits IEEE 2017 Optical Fiber Communications Conference and Exhibition (OFC), Mar. 23, 2017.

* cited by examiner

REPLACEMENT SCHEDULING METHOD AND SYSTEM FOR ULTRA-LOW LOSS OPTICAL FIBERS IN BACKBONE NETWORK

The present application is a Continuation-In-Part Application of PCT/CN2018/072984, filed on Jan. 17, 2018, which claims priority to Chinese Application No. 201711486912.4, filed on Dec. 29, 2017, all of which are incorporated by reference for all purpose as if fully set forth herein.

FIELD OF THE INVENTION

The present invention relates to a replacement scheduling method and system for ultra-low loss (ULL) optical fibers in a backbone network.

BACKGROUND OF THE INVENTION

To satisfy gradually increasing communication service requirements, an ultra-long-distance optical transmission system may use ULL optical fibers to improve transmission capacity and spectrum efficiency. A ULL optical fiber SMF-28 produced by Corning Inc. already becomes commercially available. With the benefit from the development of ULL optical fiber technologies, to satisfy future communication requirements, ULL optical fibers are likely to completely replace standard single-mode optical fibers.

In the research on advantages of ULL optical fibers, one important issue in reality is that a network operator has limited human labor resources for replacing optical fibers. It usually takes weeks or even months to replace existing optical fibers with ULL optical fibers. Once replacement with a ULL optical fiber is completed and network optimization is performed, currently used spectrum resources may be reduced, and new available spectrum resources may carry additional network services to earn additional income. For example, it is assumed three links, namely, N0-N1, N0-N2, and N1-N2 are replaced. Replacement duration of the three links is respectively proportional to a link length, and is, 10, 13, and 8 days respectively. Two replacement sequences S1 and S2 are considered respectively. (S1: N1-N2; N0-N2; N0-N1, and S2: N0-N2; N0-N1; N1-N2). If S1 is used, since the link N0-N2 uses a maximum quantity of frequency slots (FS), if replacement of the link N1-N2 is completed 8 days later, the maximum quantity of FSs used to carry all optical channels is not changed. In comparison, if S2 is used, replacement of the link N0-N2 is completed 13 days layer, and the quantity of FSs used to carry all optical channels decreases from 10 to 6 (6 is the quantity of FSs used in the link N0-N1). This means that for the second stage in S1 (or, when the second optical fiber link is replaced), the same maximum quantity of FSs is still used. For the second stage in S2, only fewer FSs are needed, and more FSs may be used to provide additional services. Similarly, when the second optical fiber link is replaced, in S1, the link N0-N2 is replaced, and the quantity of FSs decreases from 10 to 6. In S2, the link N0-N1 is replaced, and the quantity of used FSs decreases from 6 to 5. The benefits of two sequences of replacement with ULL optical fiber links may be assessed here. Regions below two curves in FIG. 1 are used to measure efficiency. A smaller area means that a value obtained by multiplying replacement duration by a spectrum resource is lower. For S1, a value obtained by multiplying a time of S1 by an FS is 270 FS×day. This corresponds to that replacement with a ULL optical fiber may obtain a benefit of 40 FS×day. For S2, the usage of a time of S2 weighted by an FS is 230 FS×day. This is equivalent to that replacement with a ULL optical fiber may obtain a benefit of 80 FS×day. Apparently, the benefit of S2 has an increase of 100% as compared with the benefit of S1.

The foregoing example shows the importance of a replacement strategy of a ULL optical fiber link with effective scheduling. A network operator intends to optimize a network again immediately after each optical fiber link is replaced to improve spectrum efficiency. However, in addition, different ULL optical fiber replacement orders severely affect an optimization effect for the network operator. Therefore, how to arrange a replacement order of optical fibers is a very important research subject.

In view of the foregoing, the designer performs an active research and innovation to create a replacement scheduling method and system for ULL optical fibers in a backbone network, so as to provide higher industrial application value.

SUMMARY OF THE INVENTION

To solve the foregoing technical problem, the objective of the present invention is to provide an appropriate replacement order of optical fibers, so as to save spectrum resources for use by additional services, thereby improving spectrum utilization efficiency.

To achieve the foregoing objective, the present invention provides a replacement scheduling method for ULL optical fibers in a backbone network. The method is referred to as a maximum gain (MG) strategy. The MG strategy specifically includes:

S1: calculating a gain respectively after each optical fiber link is replaced, that is, calculating a product of multiplying a quantity of FSs reduced after each optical fiber link is replaced by a remaining time for finishing replacing all the remaining optical fiber links; S2: selecting an optical fiber link having the highest gain after the optical fiber link is replaced to perform replacement; and repeating S1 and S2 until all the optical fiber links that need to be replaced have been replaced.

Further, an optical fiber replacement scheduling strategy is determined by using an integer linear programming (ILP) model, specifically including:

constructing the ILP model, where an optical fiber link topology to be replaced is used as an input the ILP model is run with the objective of maximizing a gain of an optical fiber link replacement process, wherein a formula of the gain of the replacement process is:

$\Sigma_{k \in 1..P} C_{k-1} \cdot T_k$, and limiting conditions of the ILP model are:

constraint 1 ensures that a maximum quantity of FSs used in an entire network is greater than one last FS occupied by any optical channel, where an expression is:

$$C_k \geq S^{d,k} + F^{d,k} \forall d \in D, k \in 0..P \quad (1),$$

constraint 2 ensures that an optical channel service request between each node pair after each optical fiber link is replaced is satisfied, where an expression is:

$$F^{d,k} = \Sigma_{m \in M} \delta_m^{d,k} \cdot f_m^d \forall d \in D, k \in 0..P \quad (2),$$

constraints 3 and 4 ensure that allocated spectra do not overlap if optical channels between different node pairs exist in a shared link, where expressions are:

$$S^{t,k} - S^{d,k} \leq V \cdot (1 - x_{d,k}{}^t + 1 - \varepsilon_d{}^t) - 1 \forall d, t \in D, k \in 0..P \quad (3),$$

$$S^{d,k} + F^{d,k} - S^{t,k} \leq V \cdot (x_{d,k}{}^t + 1 - \varepsilon_d{}^t) \forall d, t \in D, k \in 0..P \quad (4),$$

constraint 5 calculates an optical signal-to-noise ratio (OSNR) of an optical channel each time after an optical fiber is replaced, where an expression is:

$$OSNR_{reciprocal}^{d,k} = \Sigma_{l \in L} \gamma_l^{d} \cdot (\tau_l^k \cdot OSNR_{l,reciprocal}^{U} + (1 - \tau_l^k) \cdot OSNR_{l,reciprocal}^{S}) \forall d \in D, k \in 0..P \quad (5)$$

constraint 6 ensures that a modulation format selected for each optical channel satisfies an OSNR requirement, where an expression is:

$$OSNR_{reciprocal}^{d,k} - OSNR_{reciprocal}^{m} \leq \nabla \cdot (1 - \delta_m^{d,k}) \forall d \in D, m \in M, k \in 0..P \quad (6),$$

constraint 7 ensures that only one modulation format is selected for a node pair each time after an optical fiber is replaced, where an expression is:

$$\Sigma_{m \in M} \delta_m^{d,k} = 1 \forall d \in D, k \in 0..P \quad (7),$$

constraints 8 and 9 ensure that only one optical fiber link is replaced during each replacement, and constraints 8 and 10 ensure that if an optical fiber link is selected as an optical fiber link to be replaced, the optical fiber link is definitely replaced by a ULL optical fiber during a replacement, where expressions are:

$$\Sigma_{l \in L} \tau_l^k = k \forall k \in 0..P \quad (8),$$

$$\tau_l^q \geq \tau_l^k \forall l \in L, q, k \in 0..P, q > k \quad (9),$$

$$\tau_l^k \leq \theta_l \forall l \in L, k \in 0..P \quad (10), \text{ and}$$

constraint 11 calculates a time required for each replacement process, where an expression is:

$$T_k = \Sigma_{l \in L} (\tau_l^k - \tau_l^{k-1}) \cdot \Phi_l \forall k \in 0..P \quad (11), \text{ where}$$

meanings represented by the notations in the expressions are respectively:

$f_m^d$ is a quantity of FSs required when a node pair d uses a modulation format m;

$OSNR_{reciprocal}^{m}$ is an OSNR tolerance when an optical channel uses the modulation format m;

when a shortest route between a node pair passes through a link l, $\gamma_l^d = 1$; otherwise, $\gamma_l^d$ is 0;

when shortest routes between the node pair d and a node pair t share a link, $\varepsilon_d^t = 1$; otherwise, $\varepsilon_d^t$ is 0;

P is a total quantity of optical fibers that need to be replaced;

when it is planned to replace the link l, $\theta_{l=1}$; otherwise, $\theta_l$ is 0;

$\Phi_l$ is a period by which the optical fiber l is replaced;

$OSNR_{l,reciprocal}^{S}$ is an OSNR value when the link l uses a standard single-mode optical fiber;

$OSNR_{l,reciprocal}^{U}$ is an OSNR value when the link l uses a ULL optical fiber;

$\nabla$ is a maximum value;

$S^{d,k}$ is an integer variable and is a starting FS occupied by the node pair d in a kth period;

$x_{d,k}^t$ is a binary variable, and after the kth period, when a starting FS occupied by an optical channel between the node pair d is greater than that of the node pair t, $x_{d,k}^t$ is 1, that is, $S^{d,k} > S^{t,k}$; otherwise, $x_{d,k}^t$ is 0;

$\tau_l^k$ is a binary variable, and when the link l is replaced by a ULL optical fiber in the kth period, $\tau_l^k$ is 1; otherwise, $\tau_l^k$ is 0;

$OSNR_{reciprocal}^{d,k}$ is an OSNR value of the optical channel between the node pair d after the kth period;

$\delta_m^{d,k}$ is a binary variable, and after the kth period, when the node pair d uses the modulation format m, $\delta_m^{d,k}$ is 1; otherwise, $\delta_m^{d,k}$ is 0;

$F^{d,k}$ is a quantity of FSs required by the node pair d;

$C_k$ is a maximum quantity of FSs of the network after the kth period; and $T_k$ is a time consumed by the kth replacement period.

Further, the method includes determining an optical fiber link replacement process by using an ILP model when the planning scenario is computationally small which can be solved by the ILP model on a regular computer server. Under this scenario, if the optical fiber link replacement process determined by the ILP model is inconsistent with the optical fiber link replacement process calculated in claim 1, the optical fiber link replacement process determined by the ILP model is used to perform replacement of optical fiber links.

To achieve the foregoing objective, the present invention provides a replacement scheduling system for ULL optical fibers in a backbone network, including:

a gain calculation unit, configured to: before a link in a current replacement is selected, calculate a gain respectively after each optical fiber link is replaced, that is, calculate a product of multiplying a quantity of FSs reduced after each optical fiber link is replaced by a remaining time for finishing replacing all the remaining optical fiber links; and a replacement link selection unit, configured to select, according to a result of the gain calculation unit, an optical fiber link having the highest gain after the optical fiber link is replaced to complete the current replacement of an optical fiber link, the gain calculation unit and the replacement link selection unit operate repeatedly until all the optical fiber links that need to be replaced have been replaced.

Further, the system further includes an ILP model, where the ILP model uses an optical fiber link topology to be replaced as an input, the ILP model is run with the objective of maximizing a gain of an optical fiber link replacement process, $\Sigma_{k \in 1..P} C_{k-1} \cdot T_k$, and limiting conditions of the ILP model are:

constraint 1 ensures that a maximum quantity of FSs used in an entire network is greater than one last FS occupied by any optical channel, where an expression is:

$$C_k \geq S^{d,k} + F^{d,k} \forall d \in D, k \in 0..P \quad (1),$$

constraint 2 ensures that an optical channel service request between each node pair after each optical fiber link is replaced is satisfied, where an expression is:

$$F^{d,k} = \Sigma_{m \in M} \delta_m^{d,k} \cdot f_m^d \forall d \in D, k \in 0..P \quad (2),$$

constraints 3 and 4 ensure that allocated spectra do not overlap if optical channels of different node pairs exist in a shared link, where expressions are:

$$S^{t,k} - S^{d,k} \leq \nabla \cdot (1 - x_{d,k}^t + 1 - \varepsilon_d^t) - 1 \forall d, t \in D, k \in 0..P \quad (3),$$

$$S^{d,k} + F^{d,k} - S^{t,k} \leq \nabla \cdot (x_{d,k}^t + 1 - \varepsilon_d^t) \forall d, t \in D, k \in 0..P \quad (4),$$

constraint 5 calculates an OSNR of an optical channel each time after an optical fiber is replaced, where an expression is:

$$OSNR_{reciprocal}^{d,k} = \Sigma l \in L \gamma_l^{d} \cdot (\tau_l^k \cdot OSNR_{l,reciprocal}^{U} + (1 - \tau_l^k) \cdot OSNR_{l,reciprocal}^{S}) \forall d \in D, k \in 0..P \quad (5),$$

constraint 6 ensures that a modulation format selected for each optical channel satisfies an OSNR requirement, where an expression is:

$$OSNR_{reciprocal}^{d,k} - OSNR_{reciprocal}^{m} \leq \nabla \cdot (1 - \delta_m^{d,k}) \forall d \in D, m \in M, k \in 0..P \quad (6),$$

constraint 7 ensures that only one modulation format is selected for a node pair each time after an optical fiber is replaced, where an expression is:

$$\Sigma_{m \in M} \delta_m^{d,k} = 1 \forall d \in D, k \in 0..P \quad (7),$$

constraints 8 and 9 ensure that only one optical fiber link is replaced during each replacement, and constraints 8 and 10 ensure that if an optical fiber link is selected as an optical fiber link to be replaced, the optical fiber link is definitely replaced by a ULL optical fiber during a replacement, where expressions are:

$$\Sigma_{l \in L} \tau_l^k = k \forall k \in 0..P \quad (8),$$

$$\tau_l^q \geq \tau_l^k \forall l \in L, q, k \in 0..P, q > k \quad (9),$$

$$\tau_l^k \leq \theta_l \forall l \in L, k \in 0..P \quad (10), \text{ and}$$

constraint 11 calculates a time required for each replacement process, where an expression is:

$$T_k = \Sigma_{l \in L} (\tau_l^k - \tau_l^{k-}) \cdot \Phi_l \forall k \in 0..P \quad (11), \text{ where}$$

meanings represented by the notations in the expressions are respectively:

$f_m^d$ is a quantity of FSs required when a node pair d uses a modulation format m;

$OSNR_{reciprocal}^m$ is an OSNR tolerance when an optical channel uses the modulation format m;

when a shortest route between a node pair passes through a link l, $\gamma_l^d = 1$; otherwise, $\gamma_l^d$ is 0;

when shortest routes between the node pair d and a node pair t share a link, $\varepsilon_d^t = 1$; otherwise, $\varepsilon_d^t$ is 0;

P is a total quantity of optical fibers that need to be replaced;

when it is planned to replace the link l, $\theta_{l=1}$; otherwise, $\theta_l$ is 0;

$\Phi_l$ is a period during which the optical fiber l is replaced;

$OSNR_{l,reciprocal}^U$ is an OSNR value when the link l uses a standard single-mode optical fiber;

$OSNR_{l,reciprocal}^U$ is an OSNR value when the link l uses a ULL optical fiber;

$\nabla$ is a maximum, value;

$S^{d,k}$ is an integer variable and is a starting FS occupied by the node pair d in a kth period;

$x_{d,k}^t$ is a binary variable, and after the kth period, when a starting FS occupied by an optical channel of the node pair d is greater than that of the node pair t, $x_{d,k}^t$ is 1, that is, $S^{d,k} > S^{t,k}$; otherwise, $x_{d,k}^t$ is 0;

$\tau_l^k$ is a binary variable, and when the link l is replaced by a ULL optical fiber in the kth period, $\tau_l^k$ is 1; otherwise, $\tau_l^k$ is 0;

$OSNR_{reciprocal}^{d,k}$ is an OSNR value of the optical channel between the node pair d after the kth period;

$\delta_m^{d,k}$ is a binary variable, and after the kth period, when the node pair d uses the modulation format m, $\delta_m^{d,k}$ is 1; otherwise, $\delta_m^{d,k}$ is 0;

$F^{d,k}$ is a quantity of FSs required by the node pair d;

$C_k$ is a maximum quantity of FSs of the network after the kth period; and $T_k$ is a time consumed by the kth replacement period.

Further, the system includes a strategy selection unit, configured to: determine a network scale of an optical fiber link replacement network, and determine, based on a predetermined network scale boundary value, to use the MG strategy or, to use a strategy of determining optical fiber replacement scheduling using an ILP model to compute an optical fiber replacement order; and if a network scale value of a network model is greater than or equal to the predetermined network scale boundary value, use the MG strategy; or if a network scale value of a network model is less than the predetermined network scale boundary value, use the strategy of determining optical fiber replacement scheduling using a linear planning model ILP, where the predetermined network scale boundary value is determined according to a computing capability of hardware.

By means of the foregoing solution, the replacement scheduling method and system for ULL optical fibers in a backbone network according to the present invention has the following advantages:

In the technical solution of the present invention, an optical link having a highest gain is selected to perform replacement, so that as many as spectrum resources can be saved for operators for use by additional services, thereby effectively improving spectrum utilization efficiency of the operators.

The foregoing description is only brief description of the technical solutions of the present invention. For better understanding of the technical solutions of the present invention and facilitate implementation of the content in the specification, detailed description is provided below by using preferred embodiments of the present invention with reference to the accompanying drawings.

DETAILED DESCRIPTION OF THE EMBODIMENTS

Specific implementations of the present invention are further described below in detail with reference to the accompanying drawings and embodiments. The following embodiments are used to describe the present invention but are not used to limit the scope of the present invention.

Embodiment 1

This embodiment provides a replacement scheduling method for ULL optical fibers in a backbone network. The method is referred to as an MG strategy, and specifically includes:

S1: calculating a gain respectively after each optical fiber link is replaced, that is, calculating a product of multiplying a quantity of FSs reduced after each optical fiber link is replaced by a remaining time for finishing replacing all the remaining optical fiber links;

S2: selecting an optical fiber link having the highest gain after the optical fiber link is replaced to perform replacement; and repeating S1 and S2 until all the optical fiber links that need to be replaced have been replaced.

Figure 6:
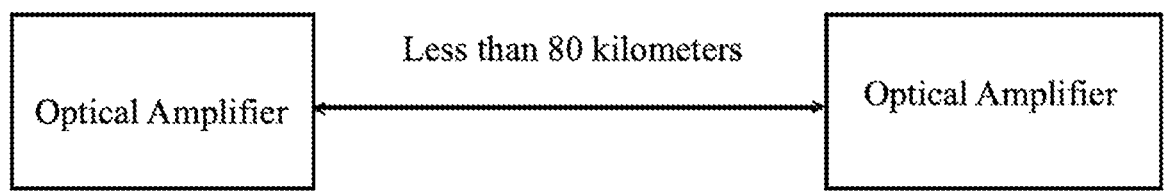
FIG. 6 shows optical amplifiers are deployed at equal distances in each of the optical fiber links and a distance between two amplifiers is less than 80 kilometers.

In this embodiment, two test networks, namely, a 6-node 9-link (n6s9) network and a 24-node 43-link USNET, are used as examples. There are at most 320 FSs in each optical fiber link, and each FS has a bandwidth of a 12.5-GHz spectrum. In each optical fiber link, as shown in FIG. 6, optical amplifiers are deployed at equal distances, and a distance between the amplifier is less than 80 kilometers. A ULL optical fiber is a Corning SMF-28 ULL optical fiber, and an attenuation coefficient is 0.168 decibel/kilometer. In the networks, four modulation formats (that is, BPSK, QPSK, 16-QAM, and 8-QAM) may be used to establish optical channels. An optical channel service request between each node pair is randomly generated within a range of [10, 200] Gb/s. An optical channel established between each node pair always follows a shortest path, and complies with a spectrum continuity constraint.

An optical fiber replacement scheduling strategy in this embodiment is referred to as an MG strategy. Other strategies are respectively referred to as a physical length (PL)-based strategy and a random strategy. In the PL-based strategy, optical fiber links to be replaced are sequentially replaced in descending order of lengths. In the random strategy, a replacement sequence of optical fiber links is generated randomly.

Figure 1:
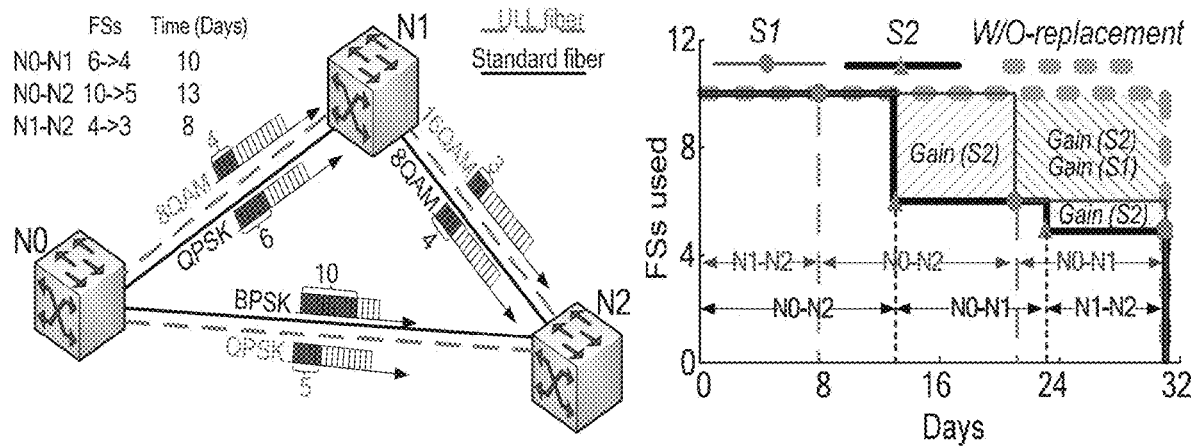
FIG. 1 shows an example of how ULL fiber replacement with different sequences would affect the benefit.
Figure 2:
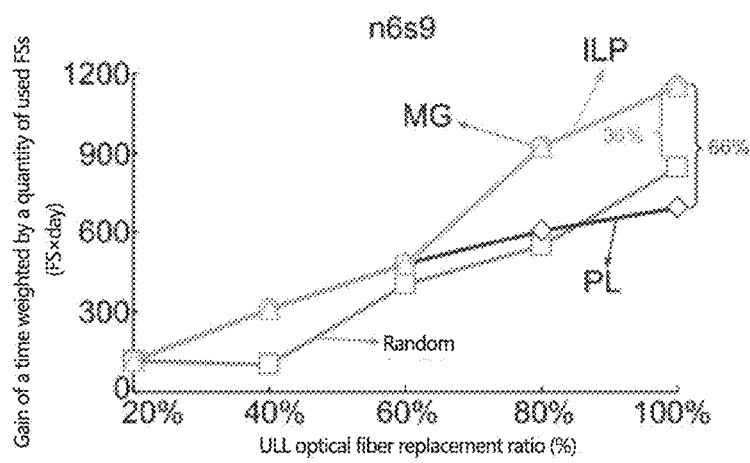
FIG. 2 shows that a gain obtained by multiplying an FS by a time increases continuously as a replacement proportion increases in an n6s9 network.
Figure 3:
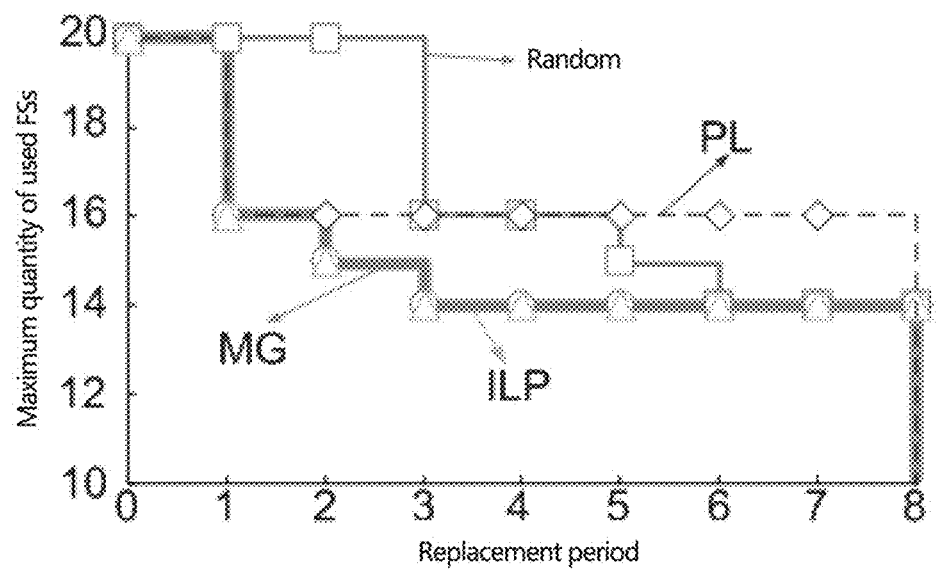
FIG. 3 shows maximum quantities of used FSs in different replacement periods.
Figure 4:
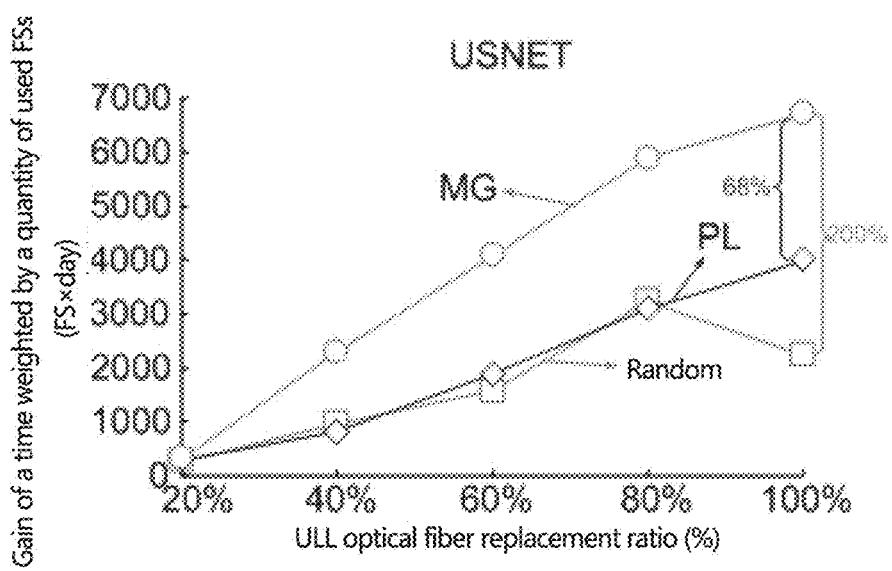
FIG. 4 shows comparison of gains between a method provided in the present invention and two other strategies.

As shown in FIG. 2 to FIG. 4, in the n6s9 network, as a replacement proportion increases, a gain obtained by multiplying an FS by a time increases continuously. This phenomenon is very reasonable. When a proportion of replaced optical fibers is larger, a chance that an optical fiber channel in the network can use a more efficient modulation format is higher, so as to increase spectrum utilization. In the comparison of three heuristic algorithms, the MG strategy obtains a highest gain, and the performance of the MG strategy is nearly the same as the optimal performance of an ILP model. Performance differences between the MG strategy and two other algorithms respectively reach 66% and 36%.

It is assumed that in the n6s9 network, when a replacement ratio of ULL optical fibers is 80%, FIG. 3 shows maximum quantities of FSs in different replacement periods. Compared with the other two strategies, the MG strategy always needs a smallest maximum quantity of FSs in different replacement stages. The reason is that when an optical fiber to be replaced is selected in the MG strategy, an optical fiber having a maximum benefit is chosen to perform replacement. Similar research has been performed on the USNET network, and results in the USNET network are shown in FIG. 4. Because the network is relatively large, the ILP model cannot work out solutions within an effective time. Similar to the case in the n6s9 network, the MG strategy has a highest gain, and is higher than the gains of the other two strategies by 66% and 200% respectively.

Embodiment 2

This embodiment provides a replacement scheduling method for ULL optical fibers in a backbone network. This embodiment is applicable to a small-scale network having a relatively small computing amount. A specific method includes:

constructing a linear planning model ILP, where an optical fiber link topology to be replaced is used as an input, the linear planning model ILP is run with the objective of maximizing a gain of an optical fiber link replacement process, a formula of the gain of the replacement process is: $\Sigma_{k\in 1..P} C_k \cdot T_k$, and limiting conditions of the linear planning model ILP are:

constraint 1 ensures that a maximum quantity of FSs used in an entire network is greater than one last FS occupied by any optical channel, where an expression is:

$$C_k \geq S^{d,k} + F^{d,k} \forall d \in D, k \in 0..P \quad (1),$$

constraint 2 ensures that an optical channel service request between each node pair after each optical fiber link is replaced is satisfied, where an expression is:

$$F^{d,k} = \Sigma_{m \in M} \delta_m^{d,k} \cdot f_m^d \forall d \in D, k \in 0..P \quad (2),$$

constraints 3 and 4 ensure that allocated spectra do not overlap if optical channels of different node pairs exist in a shared link, where expressions are:

$$S^{t,k} - S^{d,k} \leq \nabla \cdot (1 x_{d,k}^t + 1 \varepsilon_d^t) 1 \forall d, t \in D, k \in 0..P \quad (3),$$

$$S^{d,k} + F^{d,k} - S^{t,k} \leq \nabla \cdot (x_{d,k}^t + 1 - \varepsilon_d^t) \forall d, t \in D, k \in 0..P \quad (4),$$

constraint 5 calculates an OSNR of an optical channel each time after an optical fiber is replaced, where an expression is:

$$OSNR_{reciprocal}^{d,k} = \Sigma_{l \in L} \gamma_l^d \cdot (\tau_l^k \cdot OSNR_{l,reciprocal}^U + (1 - \tau_l^k) \cdot OSNR_{l,reciprocal}^S) \forall d \in D, k \in 0..P \quad (5),$$

constraint 6 ensures that a modulation format selected for each optical channel satisfies an OSNR requirement, where an expression is:

$$OSNR_{reciprocal}^{d,k} - OSNR_{reciprocal}^m \leq \nabla \cdot (1 - \varepsilon_m^{d,k}) \forall d \in D, m \in M, k \in 0..P \quad (6),$$

constraint 7 ensures that only one modulation format is selected for a node pair each time after an optical fiber is replaced, where an expression is:

$$\Sigma_{m \in M} \delta_m^{d,k} - 1 \sqrt{} / d \in D, k \in 0..P \quad (7),$$

constraints 8 and 9 ensure that only one optical fiber link is replaced during each replacement, and constraints 8 and 10 ensure that if an optical fiber link is selected as an optical fiber link to be replaced, the optical fiber link is definitely replaced by a ULL optical fiber during a replacement, where expressions are:

$$\Sigma_{l \in L} \tau_l^k = k \forall k \in 0..P \quad (8),$$

$$\tau_l^{q=\tau_l^k} \forall l \in L, q, k \in 0..P, q > k \quad (9),$$

$$\tau_l^{k=\theta_l} \forall l \in L, k \in 0..P \quad (10), \text{ and}$$

constraint 11 calculates a time required for each replacement process, where an expression is:

$$T_k = \Sigma_{l \in L} (\tau_l^k - \tau_l^{k-1}) \cdot \Phi_l \forall k \in 0..P \quad (11), \text{ where}$$

meanings represented by the letters in the expressions are respectively:

$f_m^d$ is a quantity of FSs required when a node pair d uses a modulation format m;

$OSNR_{reciprocal}^m$ is an OSNR tolerance when an optical channel uses the modulation format m;

when a shortest route between a node pair passes through a link l, $\gamma_l^d = 1$; otherwise, $\gamma_l^d$ is 0;

when shortest routes between the node pair d and a node pair t share a link, $\varepsilon_d^t = 1$; otherwise, $\varepsilon_d^t$ is 0;

P is a total quantity of optical fibers that need to be replaced;

when it is planned to replace the link l, $\theta_l = 1$; otherwise, $\theta_l$ is 0;

$\Phi_l$ is a period during which the optical fiber l is replaced;

$OSNR_{l,reciprocal}^S$ is an OSNR value when the link l uses a standard single-mode optical fiber;

$OSNR_{l,reciprocal}^U$ is an OSNR value when the link l uses a ULL optical fiber;

∇ is a maximum value;

$S^{d,k}$ is an integer variable and is a starting FS occupied by the node pair d in a kth period;

$x_{d,k}{}^t$ is a binary variable, and after the kth period, when a starting FS occupied by an optical channel of the node pair d is greater than that of the node pair t, $x_{d,k}{}^t$ is 1, that is, $S^{d,k} > S^{t,k}$; otherwise, $x_{d,k}{}^t$ is 0;

$\tau_l^k$ is a binary variable, and when the link l is replaced by a ULL optical fiber in the kth period, $\tau_l^k$ is 1; otherwise, $\tau_l^k$ is 0;

$OSNR_{reciprocal}{}^{d,k}$ is an OSNR value of the optical channel between the node pair d after the $k^{th}$ period;

$\delta_m^{d,k}$ is a binary variable, and after the $k^{th}$ period, when the node pair d uses the modulation format m, $\delta_m^{d,k}$ is 1; otherwise, $\delta_m^{d,k}$ is 0;

$F^{d,k}$ is a quantity of FSs required by the node pair d;

$C_k$ is a maximum quantity of FSs of the network after the kth period; and $T_k$ is a time consumed by the kth replacement period.

In the foregoing embodiment, a network scale of an optical fiber link replacement network is determined, and it is determined, based on a predetermined network scale boundary value, to use an MG strategy or, to use a strategy of determining optical fiber replacement scheduling using an ILP model to compute an optical fiber replacement order; and if a network scale value of a network model is greater than or equal to the predetermined network scale boundary value, the MG strategy is used; or if a network scale value of a network model is less than the predetermined network scale boundary value, the strategy of determining optical fiber replacement scheduling using an ILP model is used, where the predetermined network scale boundary value is determined according to a computing capability of hardware.

For example, for a small-scale network having fewer than ten nodes, if the optical fiber link replacement process determined by using an ILP model is better than the optical fiber link replacement process calculated in Embodiment 1, the optical fiber link replacement process determined by using an ILP model is used to perform replacement of optical fiber links. For a large-scale network having ten or more nodes, if the ILP model cannot obtain an optimal optical fiber link replacement process within a particular time, the optical fiber link replacement process calculated in Embodiment 1 is used.

Embodiment 3

Figure 5:
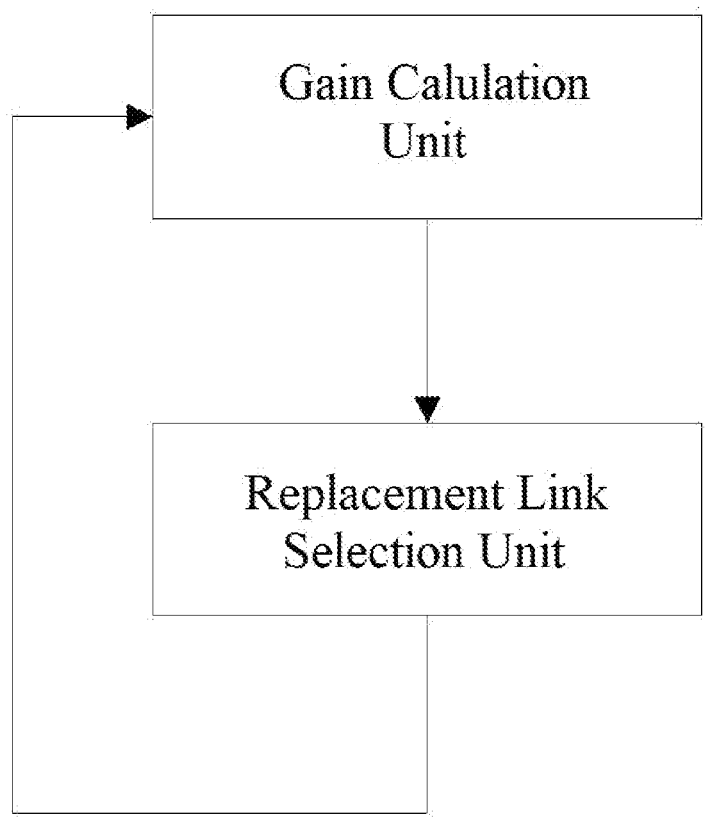
FIG. 5 shows a replacement scheduling system that includes a gain calculation unit and a replacement link selection unit.

As shown in FIG. 5, this embodiment provides a replacement scheduling system for ULL optical fibers in a backbone network, including:

a gain calculation unit, configured to: before a link in a current replacement is selected, calculate a gain respectively after each optical fiber link is replaced, that is, calculate a product of multiplying a quantity of FSs reduced after each optical fiber link is replaced by a remaining time for finishing replacing all the remaining optical fiber links; and a replacement link selection unit, configured to select, according to a result of the gain calculation unit, an optical fiber link having the highest gain after the optical fiber link is replaced to complete the current replacement of an optical fiber link, the gain calculation unit and the replacement link selection unit operate repeatedly until all the optical fiber links that need to be replaced have been replaced.

In this embodiment, the system includes an ILP model, where the ILP model uses an optical fiber link topology to be replaced as an input, the ILP model is run with the objective of maximizing a gain of an optical fiber link replacement process, $\Sigma_{k \in 1..P} C_{k-1} \cdot T_k$, and limiting conditions of the ILP model are:

constraint 1 ensures that a maximum quantity of FSs used in an entire network is greater than one last FS occupied by any optical channel, where an expression is:

$$C_k \geq S^{d,k} + F^{d,k} \forall d \in D, k \in 0..P \quad (1),$$

constraint 2 ensures that an optical channel service request between each node pair after each optical fiber link is replaced is satisfied, where an expression is:

$$F^{d,k} = \Sigma_{m \in M} \delta_m^{d,k} \cdot f_m^d \forall d \in D, k \in 0..P \quad (2),$$

constraints 3 and 4 ensure that allocated spectra do not overlap if optical channels between different node pairs exist in a shared link, where expressions are:

$$S^{t,k} - S^{d,k} \leq \nabla \cdot (1 - x_{d,k}{}^t + 1 - \delta_d{}^t) 1 \forall d, t \in D, k \in 0..P \quad (3),$$

$$S^{d,k} + F^{d,k} - S^{t,k} \leq \nabla \cdot (x_{d,k}{}^t + 1 - \delta_d{}^t) \forall d, t \in D, k \in 0..P \quad (4),$$

constraint 5 calculates an OSNR of an optical channel each time after an optical fiber is replaced, where an expression is:

$$OSNR_{reciprocal}{}^{d,k} = \Sigma_{l \in l} \gamma_l{}^k \cdot OSNR_{l,reciprocal}{}^U + (1 - \tau_l^k) \cdot OSNR_{l,reciprocal}{}^S) \forall d \in D, k \in 0..P \quad (5),$$

constraint 6 ensures that a modulation format selected for each optical channel satisfies an OSNR requirement, where an expression is:

$$OSNR_{reciprocal}{}^{d,k} - OSNR_{reciprocal}{}^m \leq \nabla \cdot (1 - \delta_m^{d,k}) \forall d \in D, m \in M, k \in 0..P \quad (6),$$

constraint 7 ensures that only one modulation format is selected for a node pair each time after an optical fiber is replaced, where an expression is:

$$\Sigma_{m \in M} \delta_m^{d,k} = 1 \forall d \in D, k \in 0..P \quad (7),$$

constraints 8 and 9 ensure that only one optical fiber link is replaced during each replacement, and constraints 8 and 10 ensure that if an optical fiber link is selected as an optical fiber link to be replaced, the optical fiber link is definitely replaced by a ULL optical fiber during a replacement, where expressions are:

$$\Sigma_{l \in L} \tau_l^k = k \forall k \in 0..P \quad (8),$$

$$\tau_l^q \geq \tau_l^k \forall l \in L, q, k \in 0..P, q > k \quad (9),$$

$$\tau_l^k \geq \theta_l \forall l \in L, k \in 0..P \quad (10), \text{ and}$$

constraint 11 calculates a time required for each replacement process, where an expression is:

$$T_k = \Sigma_{l \in L} (\tau_l^k - \tau_l^{k-1}) \cdot \Phi_l \forall k \in 0..P \quad (11), \text{ where}$$

meanings represented by the notations in the expressions are respectively:

$f_m^d$ is a quantity of FSs required when a node pair d uses a modulation format m;

$OSNR_{reciprocal}{}^m$ is an OSNR tolerance when an optical channel uses the modulation format m;

when a shortest route between a node pair passes through a link l, $\gamma_l^d = 1$; otherwise, $\gamma_l^d$ is 0;

when shortest routes between the node pair d and a node pair t share a link, $\varepsilon_d{}^t = 1$; otherwise, $\varepsilon_d{}^t$ is 0;

P is a total quantity of optical fibers that need to be replaced;

when it is planned to replace the link t, $\theta_1=1$; otherwise, $\theta_1$ is 0;

$\Phi_l$ is a period during which the optical fiber l is replaced;

$OSNR_{l,reciprocal}^S$ is an OSNR value when the link l uses a standard single-mode optical fiber;

$OSNR_{l,reciprocal}^U$ is an OSNR value when the link l uses a ULL optical fiber;

$\nabla$ is a maximum value;

$S^{d,k}$ is an integer variable and is a starting FS occupied by the node pair d in a kth period;

$x_{d,k}^t$ is a binary variable, and after the kth period, when a starting FS occupied by an optical channel of the node pair d is greater than that of the node pair t, $x_{d,k}^t$ is 1, that is, $S^{d,k} > S^{t,k}$; otherwise, $x_{d,k}^t$ is 0;

$\tau_l^k$ is a binary variable, and when the link l is replaced by a ULL optical fiber in the kth period, $\tau_l^k$ is 1; otherwise, $\tau_l^k$ is 0;

$OSNR_{reciprocal}^{d,k}$ is an OSNR value of the optical channel between the node pair & after the kth period;

$\delta_m^{d,k}$ is a binary variable, and after the kth period, when the node pair d uses the modulation format m, $\delta_m^{d,k}$ is 1; otherwise, $\delta_m^{d,k}$ is 0;

$F^{d,k}$ is a quantity of FSs required by the node pair d;

$C_k$ is a maximum quantity of FSs of the network after the kth period; and $T_k$ is a time consumed by the kth replacement period.

In this embodiment, the system further includes a strategy selection unit, configured to: determine a network scale of an optical fiber link replacement network, and determine, based on a predetermined network scale boundary value, to use an MG strategy or, to use a strategy of determining optical fiber replacement scheduling using an ILP model to compute an optical fiber replacement order; and if a network scale value of a network model is greater than or equal to the predetermined network scale boundary value, use the MG strategy; or if a network scale value of a network model is less than the predetermined network scale boundary value, use the strategy of determining optical fiber replacement scheduling using an ILP model, where The predetermined network scale boundary value is determined according to a computing capability of hardware. This embodiment is designed to implement the method in the foregoing Embodiment 1. Specific advantages have been described in the foregoing Embodiment 1, and details are no longer elaborated herein.

The foregoing is only preferred implementations of the present invention but is not used to limit the present invention. It should be pointed out that a person of ordinary skill in the art may further make several improvements and variations without departing from the technical principle of the present invention. These improvements and variations should also be construed as falling within the protection scope of the present invention.

What is claimed is:

1. A replacement scheduling system for ultra-low loss (ULL) optical fibers in a backbone network, comprising:
a gain calculation unit, configured to: before a link in a current replacement is selected, calculate a respective gain after each optical fiber link of a plurality of optical fiber links is replaced by calculating a product of multiplying a quantity of frequency slots (FSs) reduced after each optical fiber link is replaced by a remaining time for finishing replacing all remaining optical fiber links; and
a replacement link selection unit, configured to select, according to a result of the gain calculation unit, an optical fiber link having a highest gain after each optical fiber link is replaced to complete a current replacement of each optical fiber link, wherein
the gain calculation unit and the replacement link selection unit operate repeatedly until all the optical fiber links are replaced.

2. The replacement scheduling system for ultra-low loss (ULL) optical fibers in a backbone network according to claim 1, wherein the optical fiber links each have at most 320 FSs and the FSs each has a bandwidth of 12.5-GHz spectrum; and wherein optical amplifiers are deployed at equal distances in each of the optical fiber links and a distance between two amplifiers is less than 80 kilometers.

* * * * *